L. E. PINER.
CHRISTMAS TREE HOLDER.
APPLICATION FILED MAY 12, 1913.
1,110,142.
Patented Sept. 8, 1914.
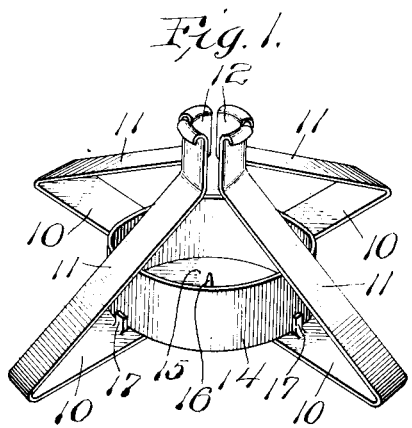
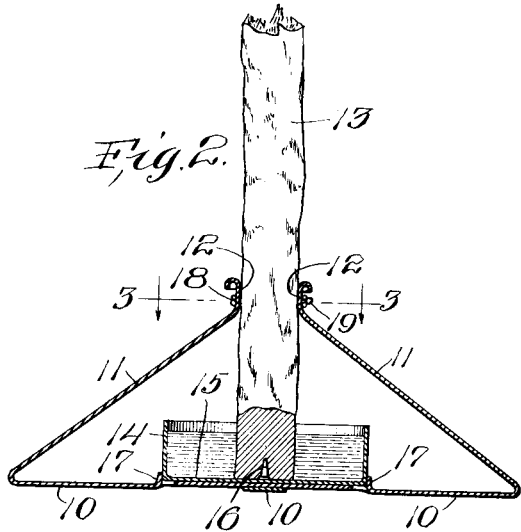
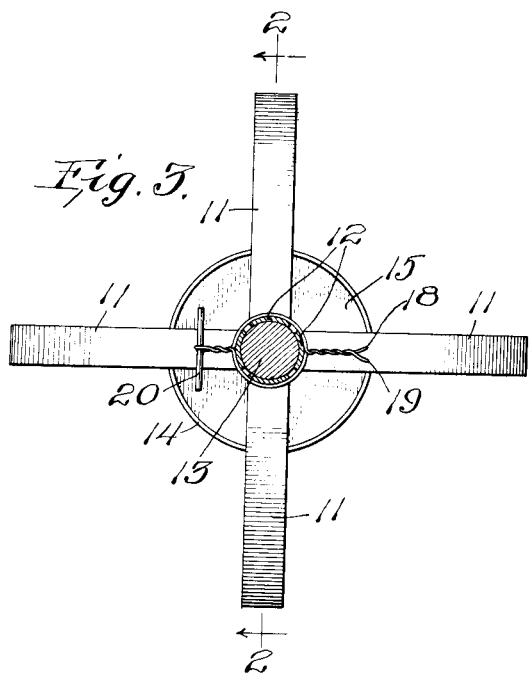
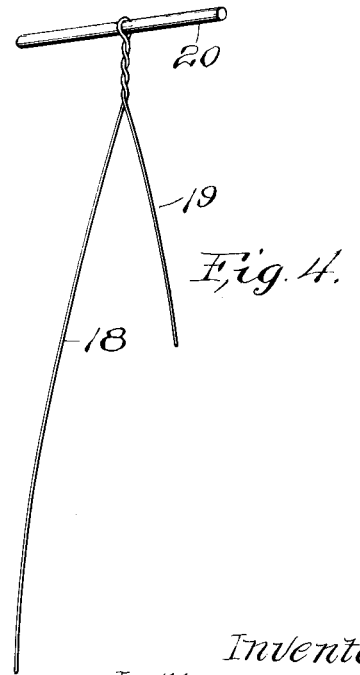
Inventor:
Luther E. Piner
by Poole & Cromer
Attys.

UNITED STATES PATENT OFFICE.

LUTHER E. PINER, OF CHICAGO, ILLINOIS.

CHRISTMAS-TREE HOLDER.

1,110,142.  Specification of Letters Patent. Patented Sept. 8, 1914.

Application filed May 12, 1913. Serial No. 766,917.

*To all whom it may concern:*

Be it known that I, LUTHER E. PINER, a citizen of the United States, and a resident of Chicago, in the county of Cook and State of Illinois, have invented certain new and useful Improvements in Christmas-Tree Holders; and I do hereby declare that the following is a full, clear, and exact description thereof, reference being had to the accompanying drawings, and to the letters of reference marked thereon, which form a part of this specification.

This invention relates to a Christmas tree holder or stand.

Among the objects of the invention is to provide a holder or stand that will receive and support any Christmas tree irrespective of the size of the trunk or stem of the same.

A further object of the invention is to provide a tree holder or stand with means that will keep and maintain the tree in a fresh and green state or condition during the time the tree is in use.

In its general features, the holder or stand forming the subject-matter of the present invention, comprises a base portion, a plurality of resilient bracing members connected with and rising from said base portion at the outer margins thereof and adapted to engage the trunk of said tree at a point above the plane of said base, for maintaining the tree in an upright position, and a water receptacle mounted on said base within said brace members and in which is located the lower end of the trunk of the tree. The lower end of the trunk of the tree within said water receptacle is prevented from lateral movement with respect to said base by means secured to the bottom of said water receptacle and engaging the lower end or base of said tree trunk.

The invention consists in the matters hereinafter described and more particularly pointed out in the appended claims.

In the accompanying drawings, illustrating my invention: Figure 1 is a perspective view of a tree holder or stand constructed in accordance with my invention; Fig. 2 is a section on line 2—2 of Fig. 3; the stem or trunk of a tree supported by the holder or stand being shown; Fig. 3 is a plan section on line 3—3 of Fig. 2; and Fig. 4 is a perspective view of a flexible binding member to be hereinafter referred to.

The tree holder or stand, shown in the accompanying drawings, comprises a base portion embracing a plurality of radially extending metal arms or bars 10. Said bars 10 are flat and are arranged in the same horizontal plane with each other so that the base of the holder or stand will rest or seat itself firmly on the floor or other supporting surface. Rising from or extending upwardly from the outer end of each of said base bars 10 and flexibly connected therewith is a metal brace member 11. The several brace members 11 are obliquely arranged with respect to the base and extend inwardly toward each other. The upper ends of said brace members 11 are located adjacent each other above the center of the base, and are adapted to surround the trunk of a tree inserted in the holder. The upper ends of said brace members 11 are bent to form vertical parts 12 which are separated from each other to form an opening through which is adapted to be inserted the trunk or stem 13 of the tree. The lower end of said tree trunk 13 stands or rests on the base of said holder or stand. Said upright parts 12 are curved transversely and are adapted to be placed in clamping engagement with the trunk 13 of said tree, at a point above the plane of said base; the brace members 11 acting to maintain the tree in upright position. To facilitate the entrance of said stem or trunk 13 between the brace members 11, the upper ends of said upright parts 12 are flared or bent outwardly. (See Fig. 2.)

In order to provide means for keeping the tree fresh and green and prevent the needles or foliage thereof from drying up and falling from the tree, the lower end of the trunk 13 of the tree extends into a water receptacle 14 which is mounted upon the base bars 10 centrally of and within said brace members 11. Said receptacle 14 is adapted to contain a quantity of water, into which the lower end of the trunk extends. The base of said tree trunk 13 stands or rests on the bottom wall 15 of said water receptacle. Secured to the bottom wall 15 of said water receptacle with its pointed end uppermost, is a nail or like pointed member 16, adapted to be driven or forced into the base of said tree trunk 13. Such member 16 serves to prevent lateral movement of the trunk with respect to the base of the stand. Said water receptacle 14 is detachably supported in place upon said base bars 10 by means of tongues or fingers 17 which extend upwardly from the bars 10 in position to engage the outer wall of said receptacle and are adapted to press yieldingly on or against the latter. As illustrated, and as preferably constructed, said tongues or fingers 17 are made integral with and bent upwardly from the several bars 10. The water receptacle 14 is large enough to hold a sufficient quantity of water for keeping the tree fresh and green for a desired length of time, but small enough to permit it to be passed between any of the two adjacent brace members 11. Said brace members 11 being flexibly connected with the said bars 10, the upper ends of said brace members may be readily spread apart or moved radially to permit the insertion of a tree trunk of any usual size therebetween. Said brace members 11 being resilient, the upright parts 12 at the upper ends thereof will yieldingly engage and bear against the trunk of said tree.

The spring action of the braces 11 holds the upright parts 12 constantly in contact with the stem or trunk 13, but, in order to keep said parts 12 constantly and firmly in contact with said trunk and prevent the same from spreading or springing outwardly, said parts 12 are held against said trunk by a flexible binding member wrapped about the same. Said binding member, as shown in the drawings, has the form of long and short strands 18 and 19, both connected with a handle 20. The long strand 18 is wrapped one or more times around said parts 12 and the short strand 19 then connected with the long strand thereof by twisting the two strands together. By turning the handle 20, after the free ends of the two strands are twisted together about said parts 12, the strands will be drawn tightly around the parts encircled thereby. It is obvious that, in lieu of the binding device described, a stout piece of twine may be used.

In the specific construction shown in the drawings, the base bars 10 and brace members 11 are formed by a flat, sheet metal strip bent into the proper shape to form said parts. The parts of said strip constituting the bars 10 cross each other at their centers and are arranged at right angles to each other in the same horizontal plane. That portion of the upper strip where it crosses or overlaps the lower strip is offset upwardly above the plane of the base to provide a notch or transverse groove through which the other strip extends, as shown in Fig. 2. By reason of this construction, the lower surface of the base of the stand is flat and will rest firmly on the floor or other supporting surface.

A Christmas tree holder or stand constructed as herein described and as shown in the drawings, is simple in its construction and may be made at a low cost. Said holder or stand is efficient in use and will receive and support trees of varying sizes. By reason of the fact that the lower end or base of the tree stands in water, the tree is kept fresh and green and the needles or foliage thereof will not fall off of the tree, thus avoiding the necessity of sweeping around the tree every day or oftener.

It is to be understood that the details of construction of the tree holder or stand illustrated may be changed or variously modified without departure from the spirit of my invention, and I do not wish to be limited to the features of construction herein described and shown, except as pointed out in the appended claims.

I claim as my invention—

1. A tree holder, comprising a base, a water receptacle mounted on said base and adapted to receive the lower end of the trunk of a tree, a plurality of bracing members connected with said base, said bracing members extending upwardly from said base and over and above said receptacle, the upper end portions of said bracing members being resilient, radially movable and adapted to be spread apart by the trunk of a tree upon the insertion of the same therebetween and to yieldingly bear against the trunk of said tree above the plane of said base; and means connecting said receptacle with said base for holding said receptacle from lateral movement on said base.

2. A tree holder, comprising a base, a water receptacle mounted on said base and adapted to receive the lower end of the trunk of a tree, a plurality of bracing members connected with said base at the outer margin thereof, said bracing members extending upwardly and inwardly from said base and over and above said receptacle, the upper end portions of said bracing members being resilient, radially movable and adapted to be spread apart by the trunk of a tree upon the insertion of the same therebetween and to yieldingly bear against the trunk of said tree above said receptacle, an upright member secured to the bottom wall of said receptacle and adapted to engage the lower end of the trunk of said tree, for preventing lateral movement thereof with respect to said base, and means connecting said receptacle with said base for holding said receptacle from lateral movement on said base.

3. A device of the character described, comprising a base, a bracing member connected with and rising from said base, said member including radially movable, resilient parts adapted to surround and to yieldingly engage the trunk of a tree above the plane of said base, and a water receptacle mounted on said base and in which the lower end of the trunk is located, said base being provided with integral upright parts adapted to engage the side walls of said receptacle.

4. A device of the character described, comprising a base, a plurality of elastic bracing members rising from said base, the upper end portions of said bracing members being radially movable and adapted to be spread apart upon the insertion of the trunk of a tree therebetween and to yieldingly engage the trunk of said tree, a water receptacle mounted on said base within said bracing members and in which the lower end of said trunk is adapted to be located, said base being provided with upright parts adapted to engage said receptacle and hold the same from lateral movement on said base, and means engaging the lower end of said trunk, to prevent lateral movement thereof with respect to said base.

In testimony, that I, claim the foregoing as my invention I affix my signature in the presence of two witnesses, this 8th day of May, A. D. 1913.

LUTHER E. PINER.

Witnesses:
EUGENE C. WANN
TILLIE C. PINER.